| United States Patent [19] | [11] Patent Number: 4,939,040 |
| --- | --- |
| Oreglia et al. | [45] Date of Patent: Jul. 3, 1990 |

[54] MULTILAYER FILM FOR PACKAGING ITEMS UNDER CONTROLLED ATMOSPHERE

[75] Inventors: Aurelio Oreglia, Como; Mario Gillio-Tos, Nerviano, both of Italy

[73] Assignee: W. R. Grace & Co.-Conn., Duncan, S.C.

[21] Appl. No.: 449,093

[22] Filed: Dec. 8, 1989

Related U.S. Application Data

[63] Continuation of Ser. No. 158,825, Feb. 12, 1988, abandoned.

[30] Foreign Application Priority Data

Apr. 24, 1987 [IT] Italy .............................. 20270 A/87

[51] Int. Cl.$^5$ .............................................. B32B 27/08
[52] U.S. Cl. .................................... 428/518; 428/522; 428/36.7
[58] Field of Search ............... 428/516, 518, 522, 36.7

[56] References Cited

U.S. PATENT DOCUMENTS

| 4,161,562 | 7/1979 | Yoshikawa et al. | 428/215 |
| 4,247,584 | 1/1981 | Widiger et al. | 428/35 |
| 4,348,437 | 9/1982 | Lustig et al. | 428/35 |
| 4,687,711 | 8/1987 | Vietto et al. | 428/516 |
| 4,690,865 | 9/1987 | Fong | 428/516 |

FOREIGN PATENT DOCUMENTS

| 20994 | 7/1979 | Japan | 428/36.7 |
| 142650 | 11/1980 | Japan | 428/36.7 |
| 1385196 | 2/1975 | United Kingdom . | |
| 2043533 | 10/1980 | United Kingdom . | |

*Primary Examiner*—Edith Buffalow
*Attorney, Agent, or Firm*—John J. Toney; William D. Lee, Jr.; Mark B. Quatt

[57] ABSTRACT

A packaging film is disclosed having both gas barrier and stretchability properties comprising at least one barrier layer made of polymers or copolymers with low gas permeability modified by the inclusion therein of 1 to 20% by weight of a stiffness modifying agent selected from plasticizers and elastomers, and at least one stretchable layer of olefin polymers or copolymers.

14 Claims, No Drawings

MULTILAYER FILM FOR PACKAGING ITEMS UNDER CONTROLLED ATMOSPHERE

This application is a continuation of application Ser. No. 158,825 filed on Feb. 12, 1988, now abandoned.

DISCLOSURE

This invention relates to a laminated multilayer film for packaging items, in particular food items, under controlled atmosphere.

For the packaging of perishable foods, for example meat and its by-products, cheese, and also various vegetables and fruits, a long felt problem has been that of preserving the respective packages so as to maintain not only the integrity of the product but also its original fresh appearance, the only one commercialy acceptable. In particular for the packed meat it is important to maintain its red colour, as main freshness indicia.

A system used for this purpose has been that of packaging perishable items under controlled atmosphere within enclosures with gas barrier properties. To this aim containers thermoformed under vacuum, or packages wrapped in barrier films have been used wherein gases, such as $CO_2$ with bacteriostatic properties or $O_2$, have been introduced up to a superatmospheric pressure of 20-50 millibars. In particular as barrier films mono- and multilayer polyvinylidene chloride (PVDC) such as Saran (trade mark of Dow Chemical Co.) or multilayer EVOH (ethylene-vinyl alcohol) films have been used. These known barrier films were rather stiff, whereby they were neither extensible; and thus stretchable, nor did they show elastic recovery, and therefore the gradual gas leakage from the respective packages resulted in a collapsing and wrinkling of the films making them to assume a commercialy unacceptable appearance. The main object of the present invention is that of providing a new type of film for packaging perishable items under controlled atmosphere which allows to obtain packages maintaining a commercially desirable appearance for extended shelf life periods.

In particular an object of the invention is that of providing packaging films having both gas barrier and elastic properties.

A further object of the invention is that of providing unit packs or masterpacks (industrial units) of perishable items under controlled atmosphere having a notably extended shelf life.

These objects are achieved by a multilayer film according to this invention for packaging items under controlled atmosphere characterized in that it comprises at least one barrier layer made of a material selected from polymers and copolymers having gas barrier properties, said material being modified by the inclusion therein of 1 to 20% by weight of the barrier layer of a stiffness modifying agent selected from plasticizers and gas barrier elastomers, and at least one stretchable layer selected from olefin polymers and copolymers, said film having a gas permeability of less than 50 cm3 $O_2$/24 hours/m2/atm, and being stretchable.

The present invention provides thus for the first time a film having gas barrier properties and at the same time high elongation and elastic recovery, which is particularly suitable for packaging perishable items under controlled atmosphere.

The multilayer film of the invention comprises as critical characterizing elements thereof at least a barrier layer and at least a stretchable layer of high elongation and elastic recovery.

The barrier layer is made of a material selected from polymers and copolymers known for having gas barrier properties such as PVDC, EVOH, nylons, acrylonitrile-methylacrylate copolymers (such as that known under the trademark Barex available from Sohio Chemical Co.). These gas barrier polymeric materials, normally stiff, are modified in accordance with the present invention by a selected stiffness modifying agent in order to reduce their inherent stiffness without sensibly impairing their gas barrier properties.

The stiffness modifying agent can be selected from plasticizers for polymers and elastomers having themselves gas barrier properties so as to contribute to the overall barrier property of the film.

As plasticizers, polymer plasticizers such as adipic acidbutandiol polyesters, epoxidized soya oils, and chlorinated paraffins, for example that known under the trademark as Cerechlor available from Hoechst Aktiengesellschaft, Germany or non polymeric plasticizers such as 2-ethylhexyl diphenyl phosphate, acetyl tributyl citrate or di-n-hexyl azelate, can be used.

As elastomers with gas barrier properties butyl rubbers, polyisobutylene or neoprene can be illustratively used or styrene-butadiene copolymer, carboxylated or not.

The stiffness modifying agent is incorporated by mixing it into the barrier layer polymer in an amount of 1 to 20% by weight of the weight of this latter. In some specific cases, such as when using PVDC as barrier layer, the stiffness modifying agent can be incorporated into the polymer already during its polymerization process.

The stretchable layer with high elongation and elastic recovery of the multilayer film of the invention comprises a olefin polymer or copolymer, such as copolymers of ethylene with 18 to 40% by weight of the copolymer of a comonomer selected from vinyl acetate (VA), methylacrylate (MA) or butylacrylate (BA). The preferred copolymer is EVA (ethylene-vinylacetate) with 28 to 40% by weight of VA. The composition of these copolymers as set forth above is critical in that lower/comonomer contents do not result in sufficiently high elastic recovery, while higher comonomer contents result in films difficult to process.

The multilayer film according to the invention can comprise more than one of each of said critical barrier and stretchable layers, and can comprise further conventional layers, e.g. at least one outer thermosealing layer. The thermosealant has to ensure a very good sealability also in presence of contamination and folds to guarantee that the gas atmosphere is maintained in the pack. A thermosealing layer can be used for this purpose, made for example of copolymers of ethylene with 5 to 25% by weight of the copolymer of a comonomer selected from VA, MA or BA, of ethylene copolymers known as very low and ultra low density polyethylene (with a density ranging of from 0.89 to 0.910) comprising from 15 to 22% by weight of an olefine comonomer with C4 to C8 carbon atoms, preferably octene, and of ionomeric resins.

A preferred multilayer film structure according to the invention comprises the following succession of layers: thermosealant/stretchable/barrier/stretchable/thermosealant wherein the intermediate stretchable or core layer, beyond providing high elongation and elastic recovery, has also to provide a good bond to the adjacent layers.

The film according to the invention possesses barrier properties, expressed as permeability to gases, lower than 50 cm3 O2/24 hours/m2/atm, and preferably of about 30 cm3 O2/24 hours/m2/atm, and at the same time an elongation higher than 500% of the initial length, allowing for a good mono- and bi-axial stretchability of the film, as well as a high elastic recovery after stretch, which is of 60-90% after 100% elongation.

Owing to these properties, packages can be obtained under controlled gas atmosphere having a desirable appearance, wherein the film remains perfectly tight even after the gradual and continuous reduction in the internal pressure due to the gas leakage (although remarkably slowed down by the barrier layer) by permeation through the film. Perishable items packages are thus obtained wich have a shelf life of 6-7 days and more, during which period they maintain a perfect desirable, appearance.

The film according to the invention is manufactured by known lamination techniques, such as by coextrusion of its various component layers. The film, if desired, can be cross-linked in order to enhance certain properties thereof such as by irradiation with quick electrons.

In accordance with the intended end uses, the film of the invention is prepared with thicknesses ranging from 15 to about 150 microns. For single packages or consumer units 15 to 30 microns thick films are used, while for wrapping multiple packages, i.e. masterpacks or industrial units, 75 to 150 microns thick films are used.

Independently of the overall thickness, more than 50% of the film thickness is given by the stretchable (core) layer or layers, the thermosealing layer or layers have a thickness normally ranging from 5 to 15μ, while the remaining of the thickness is given by the barrier layer or layers and by possible further conventional layers being present.

The stretchable barrier film of the invention is advantageously applicable by automatic packaging equipment which directly strecthes mono- or biaxially the film during packaging and injects into the packages a selected gas ensuring the required controlled atmosphere, usually up to a superatmospheric pressure of 20 to 50 millibars. When the film according to the invention is used to produce masterpacks, a number of conventional single or consumer unit packs are wrapped therein and a selected gas is introduced inside the wrapper externally to the single packs.

The examples which follow are given for illustrative purposes only in order to show non limitative embodiments of the film according to the invention.

EXAMPLES 1 and 2, and COMPARATIVE EXAMPLE 3

Two films according to the invention have been prepared having the structures 1 and 2 set forth below, and a reference film with the structure 3 has been prepared corresponding to a conventional non-stretchable barrier film.

The properties of the so obtained films have been tested and are compared in Table I set forth herebelow.

(1)
EVA 18/ EVA 28/ PVDC + Plast. 1/ EVA 28/ EMA 18
10μ     20μ      10μ              20μ    15μ    = 75μ

-continued (2)
EVA 18/ EVA 28/ PVDC + Plast. 2/ EVA 28/ EMA 18
10μ     20μ      10μ              20μ    10μ    = 70μ

(3)
EVA 18/ PVDC/ EMA 18
25μ     25μ   25μ    = 75μ

TABLE I

| Film | 1 | 2 | 3 |
|---|---|---|---|
| Elongation (%) | 550 | 600 | 450 |
| Elastic Recovery (%) after 100% elongation | 75 | 80 | 50 |
| Modulus (kg/cm) | 9.0 | 8.0 | 11 |
| O2 barrier | 30 | 30 | 40 |

We claim:

1. A stretchable, gas barrier multilayer film for packaging items under controlled atmosphere comprises at least one barrier layer made of a material selected from polymers and copolymers having gas barrier properties, said barrier material being modified by the inclusion therein of 1 to 20% by weight of the barrier layer of a stiffness modifying agent selected from plasticizers and gas barrier elastomers to make said barrier layer stretchable; and, at least one stretchable layer selected from olefin polymers and copolymers, said multilayer film having sufficient plasticizer in said barrier layer so that the film can be stretched to an elongation of at least 500% while maintaining a gas permeability of less than 50 cm$^3$ O$_2$/24 hours/m$^2$/atm and an elastic recovery after stretch of at least 60% after 100% elongation.

2. A multilayer film according to claim 1 wherein said barrier layer is made of a material selected from polyvinylidene chloride, ethylene-vinyl alcohol copolymers, nylons and acrylonitrile-methyl acrylate copolymers.

3. A multilayer film according to claim 1 wherein said stiffness modifying agent is selected from adipic acid-butandiol polyesters, epoxidized soya oils, chlorinated paraffines, 2-ethylhexyl diphenyl phosphate, acetyl tributyl citrate, di-n-hexyl azelate, butyl rubbers, polyisobutylene, neoprene, styrene-butadiene copolymer, carboxylated styrene-butadiene copolymer, and their mixtures.

4. A multilayer film according to anyone of the claims 1 to 3 wherein said stretchable layer is selected from copolymers of ethylene with a comonomer selected from vinylacetate, methylacrylate and butylacrylate, said copolymer containing from 18 to 40% by weight of said comonomer.

5. A multilayer film according to claim 1 further comprising at least one outer thermosealing layer selected from copolymers of ethylene with 5 to 25% weight of the copolymer of a comonomer selected from vinylacetate, methylacrylate and butylacrylate, very low density ethylene copolymers with 15 to 22% by weight of a C4-C8 olefin comonomer, and ionomeric resins.

6. A multilayer film according to claim 1 wherein said barrier layer comprises polyvinylidene chloride containing 1 to 20% by weight of said plasticizer.

7. A multilayer film according to claim 6 wherein said plasticizer is selected from epoxidized soya oil, adipic acid-butandiol polyesters, chlorinated paraffines and their mixtures.

8. A multilayer film according to claim 1 wherein said stretchable layer comprises an ethylene-vinylacetate copolymer containing 28 to 40% by weight of vinylacetate.

9. A multilayer film according to claim 1 comprising at least a gas barrier layer of polyvinylidene chloride comprising 1 to 20% by weight of said stiffness modifying agent, at least a stretchable layer of ethylene-vinylacetate copolymer containing 18% to 40% by weight of vinylacetate, and further comprising at least an outer thermosealing layer of ethylene-vinylacetate copolymer containing 5 to 25% by weight of vinylacetate.

10. A multilayer film according to claim 1 for use in packaging single unit packs under controlled atmosphere having a thickness of 15 to 30 micron.

11. A multilayer film according to claim 1 for use in packaging multiple or masterpacks under controlled atmosphere having a thickness of 75 to 150 microns.

12. A multilayer film according to claim 1 wherein said at least one stretchable layer accounts for more than 50% of the overall thickness of the film.

13. A single package of perishable items having extended shelf life comprising a wrapper according to claim 1 previously stretched and containing inside an atmosphere of a selected gas.

14. A multiple package of perishable items having extended shelf life comprising an outer wrapper of a multilayer film according to claim 1 previously stretched and containing inside an atmosphere of a selected gas.

* * * * *